United States Patent [19]
Harada et al.

[11] Patent Number: 6,028,869
[45] Date of Patent: Feb. 22, 2000

[54] POLARIZATION CONTROL ELEMENT AND SOLID STATE LASER

[75] Inventors: Akinori Harada; Chiaki Goto; Hiroaki Hyuga, all of Kanagawa-ken, Japan

[73] Assignee: Fuji Photo Film Co., Ltd., Kanagawa-ken, Japan

[21] Appl. No.: 08/940,974

[22] Filed: Sep. 30, 1997

[30] Foreign Application Priority Data

Sep. 30, 1996 [JP] Japan .................................. 8-258935

[51] Int. Cl.[7] ...................................................... H01S 3/136
[52] U.S. Cl. ................................ 372/19; 372/27; 372/21; 359/494
[58] Field of Search ................................ 372/20–23, 27, 372/19; 359/494–500

[56] References Cited

U.S. PATENT DOCUMENTS

| | | | |
|---|---|---|---|
| 4,199,226 | 4/1980 | Weber et al. ............................ | 359/495 |
| 5,062,694 | 11/1991 | Bair .......................................... | 359/498 |
| 5,287,214 | 2/1994 | Robertson et al. .................. | 359/499 X |
| 5,493,426 | 2/1996 | Johnson et al. ............................ | 349/74 |
| 5,502,738 | 3/1996 | Hyuga ....................................... | 372/21 |
| 5,588,013 | 12/1996 | Reitz et al. ................................ | 372/19 |

*Primary Examiner*—John D. Lee
*Attorney, Agent, or Firm*—Sughrue, Mion, Zinn, Macpeak & Seas, PLLC

[57] ABSTRACT

A polarization control element for controlling the direction of polarization and the longitudinal mode of a laser is formed by cutting a birefringent crystal so that its light incident face and light emanating face are at an angle to the optical axis of the crystal and adjusting the thickness and the reflectivities of the faces of the crystal so that the crystal can function as a Fabry-Perot etalon. The thickness of the birefringent crystal is set so that the wavelengths selected by the birefringent crystal for two laser oscillation modes whose directions of polarization are normal to each other differ from each other.

6 Claims, 4 Drawing Sheets

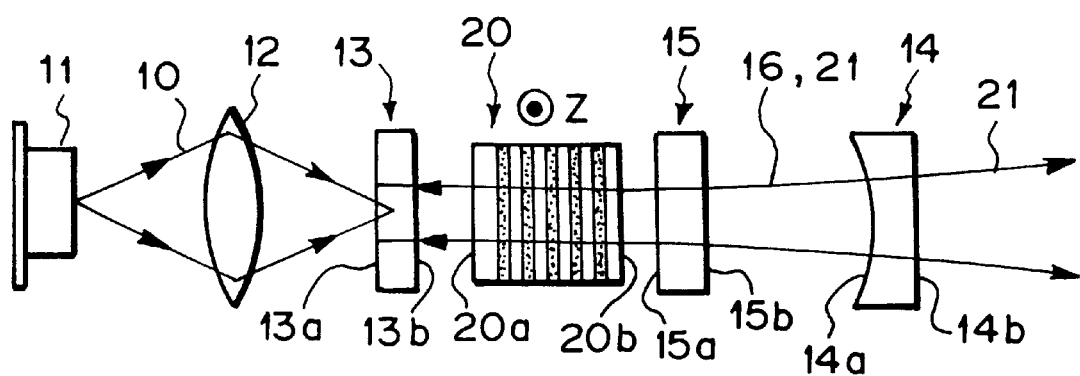
F I G. 1

POLARIZATION CONTROL ELEMENT AND SOLID STATE LASER

BACKGROUND OF THE INVENTION

1. Field of the Invention

This invention relates to a polarization control element for obtaining a linearly polarized single longitudinal mode laser beam and to a solid state laser which is provided with such polarization control element in its resonator and generates a linearly polarized single longitudinal mode laser beam.

2. Description of the Related Art

As disclosed, for instance, in Japanese Unexamined Patent Publication No. 62(1987)-189783, there has been known a solid state laser in which a solid laser crystal doped with a rare earth element such as neodymium (Nd) is pumped with a laser beam emitted from a semiconductor laser or the like. In this type of solid state laser, in order to obtain a laser beam having a shorter wavelength, it is widely practiced to convert the wavelength of a laser beam emitted from the solid laser crystal to a second harmonic by a crystal of a nonlinear optical material disposed in the resonator of the solid state laser.

There has been a demand for this type of laser as well as lasers of other types to be able to generate a linearly polarized single longitudinal mode laser beam. However when an optically isotropic crystal like a YAG crystal is employed as the solid laser medium, a linearly polarized laser beam cannot be obtained. Conventionally, a Brewster's plate for polarization control is disposed in the resonator in order to obtain a linearly polarized laser beam or a Brewster's plate and an etalon are disposed in the resonator in order to obtain a linearly polarized single longitudinal mode laser beam.

However there has been known the fact that imperfectness in surface accuracy and a slight deviation from the Brewster's angle of the optically polished surface of the Brewster's plate as well as scatter on the surface and/or inside of the Brewster's plate can result in large loss of light introduced into the resonator. Also scatter on the surface and/or inside of the etalon can result in loss of light introduced into the resonator though not so large as that in the Brewster's plate. Such loss of light deteriorates the oscillation efficiency of the solid state laser.

Especially when both the Brewster's plate and the etalon are disposed in the resonator, the manufacturing cost of these optical elements and the cost for adjustment of these optical elements are high and add to the manufacturing cost of the solid state laser.

As a polarization control element which can overcomes the aforesaid problems, there has been known a polarization control element disclosed in U.S. Pat. No. 5,502,738. The polarization control element is formed by angle-cutting a birefringent crystal, that is, cutting the crystal so that its light incident face and light emanating face are at an angle to the optical axis of the crystal, and adjusting the thickness and the reflectivities of the faces of the crystal so that the crystal can function as a Fabry-Perot etalon.

When a light ray enters the polarization control element, the ordinary ray and the extraordinary ray of the light ray are separated from each other. When the polarization control element is disposed in a resonator of a laser, one the ordinary ray and the extraordinary ray is selected according to the position of the resonator mirrors and is caused to oscillate, whereby a linearly polarized laser beam emanates from the resonator. At the same time, the polarization control element which functions also as an etalon selects the wavelength and makes the laser beam a single longitudinal mode.

The polarization control element of a birefringent crystal generates a loss of light introduced into the resonator smaller than that of the Brewster's plate, and accordingly, the solid state laser provided with such a polarization control element can oscillate at a high efficiency.

However the solid state laser with such a polarization control element sometimes comes to generate a laser beam polarized in a direction normal to the original polarizing direction in a high-order transverse mode in a certain temperature range when the temperature of the resonator and/or the pumping semiconductor laser changes while the solid state laser is generating a linearly polarized laser beam in a single longitudinal mode or a single transverse mode.

When the solid state laser comes to generate a laser beam in a high-order transverse mode, the linear polarization properties deteriorate and especially when the wavelength of the laser beam is converted by a wavelength conversion element, the output of the wavelength-converted beam lowers.

SUMMARY OF THE INVENTION

In view of the foregoing observations and description, the primary object of the present invention is to provide a polarization control element which can linearly polarize a laser beam and make a laser beam a single longitudinal mode or a single transverse mode without fear that a high-order transverse mode is generated.

Another object of the present invention is to provide a solid state laser which can generate a linearly polarized single longitudinal mode laser beam at a high oscillation efficiency with the loss of light introduced into the resonator being highly suppressed and at the same time is high in both the linear polarization properties and the output stability over a wide temperature range.

In accordance with an aspect of the present invention, there is provided a polarization control element formed by angle-cutting a birefringent crystal and adjusting the thickness and the reflectivities of the faces of the crystal so that the crystal can function as a Fabry-Perot etalon, wherein the improvement comprises that the thickness of the birefringent crystal is set so that the wavelengths selected by the birefringent crystal for two laser oscillation modes whose directions of polarization are normal to each other differ from each other.

The solid state laser in accordance with another aspect of the present invention is characterized in that the polarization control element of the aforesaid structure is disposed in its resonator.

When the polarization control element of a birefringent crystal is disposed in the resonator of the solid state laser, the polarization of the laser beam and the longitudinal mode are controlled in the manner described above.

When the thickness of the birefringent crystal is set so that the wavelengths selected by the birefringent crystal for two laser oscillation modes whose directions of polarization are normal to each other differ from each other, that is, for example, when the thickness of the birefringent crystal is set so that the wavelength selected by the birefringent crystal for the ordinary ray coincides with the gain peak of the laser, the etalon loss for the extraordinary ray is enlarged. This suppresses oscillation of the extraordinary ray and prevents high-order transverse mode oscillation, whereby a laser which is high in the linear polarization properties and the output stability over a wide temperature range can be obtained.

BRIEF DESCRIPTION OF THE DRAWINGS

FIG. 1 is a side view showing a solid state laser in accordance with an embodiment of the present invention.

DESCRIPTION OF THE PREFERRED EMBODIMENT

Figure 2:
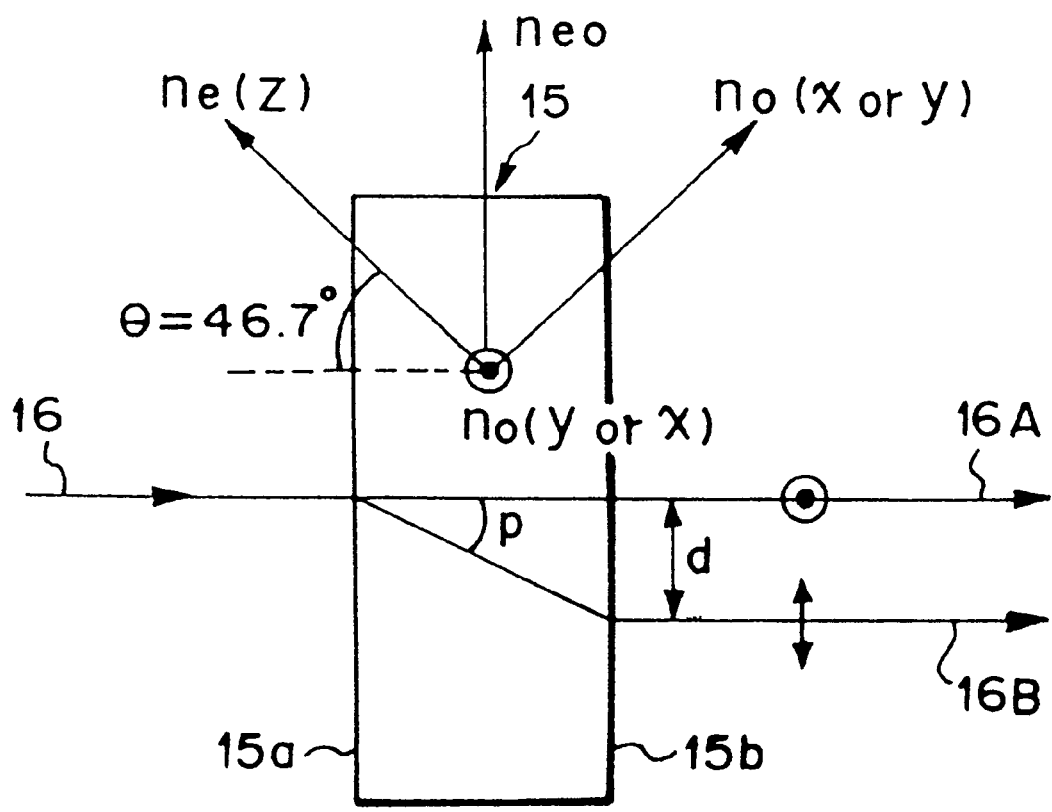
FIG. 2 is a side view showing the polarization control element employed in the solid state laser.

In FIG. 1, a laser-diode-pumped solid state laser in accordance with an embodiment of the present invention comprises a semiconductor laser 11 which produces a laser beam 10 as a pumping beam, a condenser lens 12 which condenses the laser beam 10, which is produced as divergent light, a YAG crystal 13 which is a solid laser medium doped with neodymium (Nd) (will be referred to as "Nd:YAG crystal 13", hereinbelow), and a resonator mirror 14 disposed forward (the right side as seen in FIG. 1) of the Nd:YAG crystal 13. A polarization control element 15 is disposed between the resonator mirror 14 and the Nd:YAG crystal 13 and an optical wavelength convertor 20 is disposed between the polarization control element 15 and the Nd:YAG crystal 13.

These elements are mounted on one casing (not shown). As will be described later, the Nd:YAG crystal 13 and the resonator mirror 14 form a resonator for a solid laser, and the resonator and the semiconductor laser 11 are kept at a predetermined temperature by a Peltier element and a temperature control circuit which are not shown.

The semiconductor laser 11 produces a laser beam 10 having a wavelength of 809 nm and the outputs of the semiconductor laser 11 is 400 mW. The Nd:YAG crystal 13 contains 1 atm % of Nd and is 1 mm in thickness. Neodymium ions in the Nd:YAG crystal 13 are stimulated by the laser beam 10 and the Nd:YAG crystal 13 thereby produces a laser beam having a wavelength of 946 nm. The resonator mirror 14 has a mirror surface 14a the radius of curvature of which is 2 mm. The optical wavelength convertor 20 may comprise, for instance, a bulk crystal of $LiNbO_3$ having periodic domain reversals which is 3 mm in length.

The polarization control element 15 is a birefringent crystal of calcite which is 0.8 mm in thickness and is cut so that its rear and front end faces 15a and 15b make an angle of 46.7° to the optical axis of the crystal.

Rear and front end faces 13a and 13b of the Nd:YAG crystal 13, the mirror surface 14a and the light emanating end face 14b of the resonator mirror 14 and the rear and front end faces 15a and 15b of the polarization control element 15 are respectively provided with coatings whose reflectivities R (%) and transmittances T (%) with respect to wavelengths of 809 nm, 946 nm, 1064 nm, 1300 nm, and 473 nm are as follows, 1064 nm and 1300 nm being other oscillating wavelengths of the Nd:YAG crystal 13 and 473 nm being the wavelength of the second harmonic to be described later.

|        | 13a       | 13b       | 14a       | 14b       | 15a       | 15b     |
|--------|-----------|-----------|-----------|-----------|-----------|---------|
| 809 nm | T ≧ 85    | R ≦ 2     |           |           |           |         |
| 946 nm | R ≧ 99.9  | R ≦ 0.1   | R ≧ 99.9  | R ≦ 0.2   | R = 10    | R = 10  |
| 1064 nm| T ≧ 30    | R ≦ 10    | T ≧ 30    | R ≦ 10    |           |         |
| 1300 nm| T ≧ 70    | R ≦ 25    | T ≧ 70    | R ≦ 25    |           |         |
| 473 nm | R ≧ 98    | R ≦ 10    | T ≧ 93    | R ≦ 0.3   | R ≦ 1     | R ≦ 1   |

The reflectivities of rear and front end faces 20a and 20b of the optical wavelength convertor 20 are as follows.

|        | 20a    | 20b    |
|--------|--------|--------|
| 946 nm | R ≦ 1  | R ≦ 1  |
| 473 nm | R ≦ 1  | R ≦ 1  |

In the solid state laser with the aforesaid structure, standing wave of 946 nm is generated between the end faces 15a and 15b of the polarization control element 15, and only the light of 956 nm strongly resonates between the rear end face 13a of the Nd:YAG crystal 13 and the mirror surface 14a, whereby a laser beam 16 is obtained. The single longitudinal mode laser beam 16 thus obtained is converted into its second harmonic 21 having a wavelength of 473 nm equal to a half of the wavelength of the laser beam 16 by the optical wavelength convertor 20. The laser beam 16 of 946 nm hardly passes through the mirror surface 14a of the resonator mirror 14 and a part of the second harmonic 21 of 473 nm passes through the mirror surface 14a and emanates from the light emanating face 14b of the resonator mirror 14.

In this embodiment, the polarization control element 15 is made to function also a Fabry-Perot etalon by providing suitable coatings on the end faces 15a and 15b thereof. However it is also possible to make the polarization control element 15 function as a Fabry-Perot etalon by utilizing Fresnel reflection of the crystal forming the polarization control element 15. In this particular embodiment, the distance between the rear end face 13a of the Nd:YAG crystal 13 and the mirror surface 14a, that is, the length of the resonator is 10 mm.

The laser beam 16 of 946 nm emanating from the Nd:YAG crystal 13 which is optically isotropic is divided into an ordinary ray 16A and an extraordinary ray 16B by the birefringent polarization control element 15 as shown in FIG. 2. By appropriately positioning the resonator mirror 14 with respect to the directions of the ordinary ray 16A and the extraordinary ray 16B, it is possible to cause only one of the ordinary ray 16A and the extraordinary ray 16B to oscillate. Thus the laser beam 16 can be linearly polarized light.

It has been ascertained that the second harmonic 21 obtained by wavelength conversion of the laser beam 16 is also linearly polarized light and at the same time in a single longitudinal mode. The output is 6 mW. This output of the second harmonic is as high as twice that of the conventional solid state laser in which a Brewster's plate and an etalon are disposed in the resonator in place of the polarization control element 15.

When the nonlinear optical coefficient $d_{33}$ of the optical wavelength convertor 20, which comprises a $LiNbO_3$ crystal having periodic domain reversals, is to be utilized, the direction of linear polarization of the laser beam 16 of 946 nm (fundamental wave) must coincide with the direction of the z-axis of the $LiNbO_3$ crystal. Accordingly, when the optical wavelength convertor 20 and the polarization control element 15 are positioned as shown in FIG. 1, the position of the resonator mirror 14 may be adjusted so that only the ordinary ray is caused to oscillate.

Generally the following formula holds $$\rho = \theta - \tan^{-1}\left(\frac{n_o^2}{n_e^2}\tan\theta\right)$$

wherein θ represents the angle which incident light makes to the optical axis of a birefringent crystal, ρ represents the angle between the ordinary ray and the extraordinary ray, and $n_o$ and $n_e$ respectively represent the refractive indexes of the crystal to the ordinary ray and the extraordinary ray.

Accordingly, when the crystal is t in thickness, the separation d between the ordinary ray and the extraordinary ray is represented as follows.

$$d = t\times\tan\rho = t\frac{(n_e^2 - n_o^2)\tan\theta}{n_e^2 + n_o^2\tan^2\theta}$$

It is preferred that the separation d be larger.

Calcite is low in refractive index and at the same time is large in birefringency (the difference between the refractive indexes $n_o$ and $n_e$) as compared with other birefringent materials. Accordingly in the case of the polarization control element 15 of calcite, said separation d can be large, and calcite is very desirable for forming the polarization control element 15 of the present invention.

Generally the indicatrix of a birefringent crystal is given by the following formula, wherein $N_{eo}$ represents the refractive index in an intermediate direction between z-axis and x- or y-axis.

$$n_{eo} = \frac{n_e n_o}{\sqrt{\cos^2\theta n_o^2 + \sin^2\theta n_e^2}}$$

In order to obtain polarization control effect, the polarization control element 15 is formed by cutting calcite crystal along cleavage planes so that its rear and front end faces 15a and 15b make an angle of 46.7° to the optical axis of the crystal (θ=46.7°). Since the refractive indexes of calcite $n_o$ and $n_e$ to a wavelength of 946 nm are 1.6448 and 1.4806, respectively, the refractive index $N_{eo}$ is 1.5514 from the formula above in this case.

On the other hand, the relation between the thickness t of the etalon and the wavelength selected by the etalon for the light polarized in the direction in which the refractive index of the etalon is $n_o$ (will be referred to as "the $n_o$ direction", hereinbelow) and that for the light polarized in the direction in which the refractive index of the etalon is $n_{eo}$ (will be referred to as "the $n_{eo}$ direction", hereinbelow) are as follows. light polarized in the $n_o$ direction: $2n_o t = m_o \lambda_o$ light polarized in the $n_{eo}$ direction: $2n_{eo} t = m_{eo} \lambda_{eo}$ wherein $m_o$ and $m_{eo}$ represent integers and $\lambda_o$ and $\lambda_{eo}$ represent the wavelengths selected by the etalon.

In order to prevent oscillation in second etalon mode, the free spectral range of the etalon should be basically equivalent to the gain width of the YAG, 08 nm. In order to let the polarization control element 15 of calcite function as an etalon whose free spectral range os 0.8 nm, the thickness of the etalon, i.e., the polarization control element 15 should be 350 μm or so.

Figure 3:
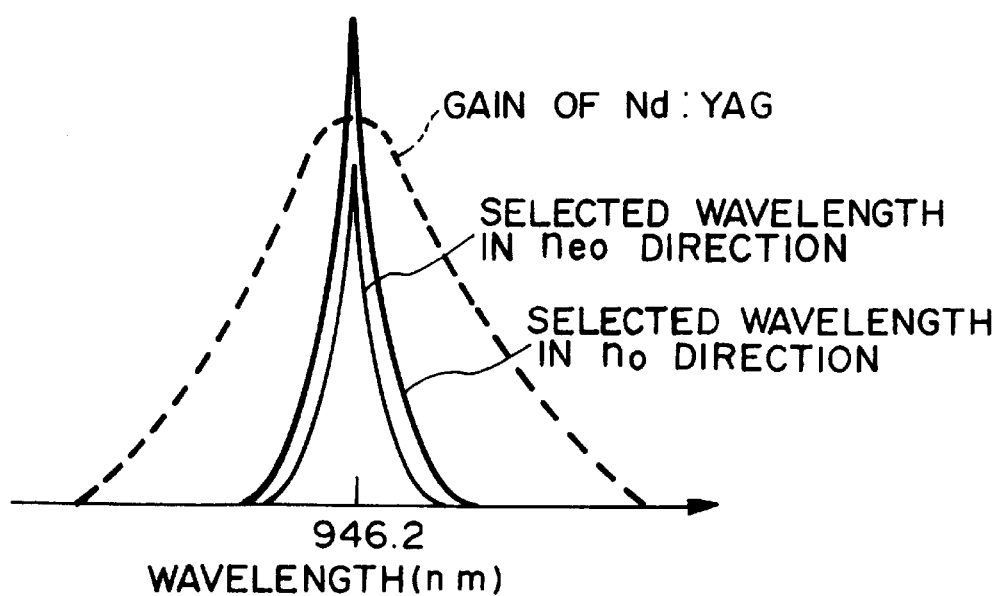
FIG. 3 is a graph showing the relation between the gain of a conventional solid state laser and the wavelength selected by the etalon.

The thicknesses of the etalon at which the selected wavelengths $\lambda_o$ and $\lambda_{eo}$ determined according to the formulae (4) and (5) become equal to each other as shown in FIG. 3 appear at intervals of about 5 μm, that is, 344 μm, 349 μm and 354 μm.

Figure 4:
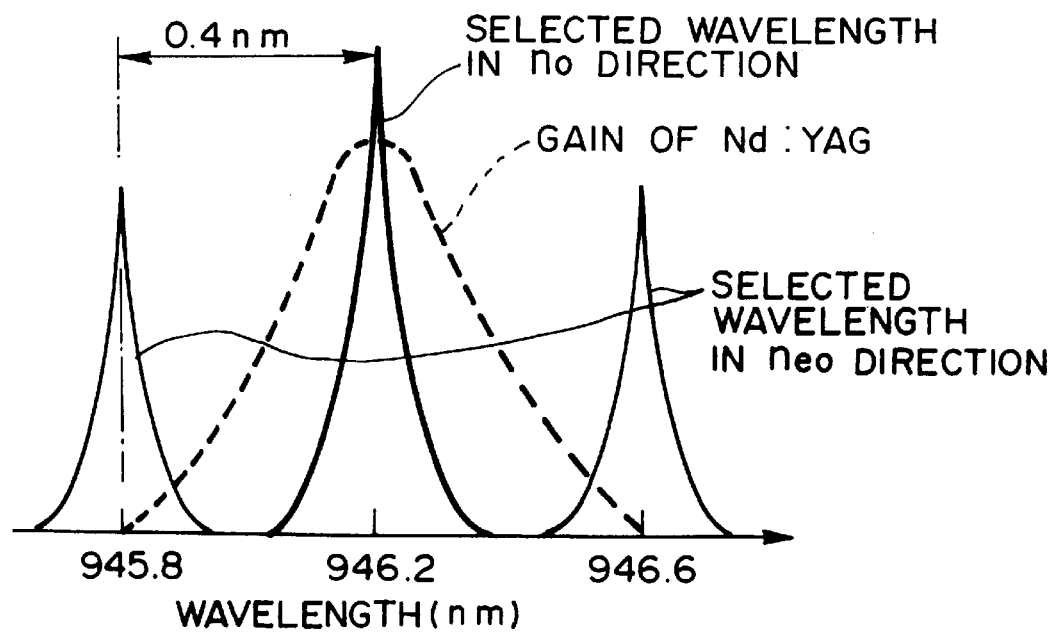
FIG. 4 is a graph showing the relation between the gain of the solid state laser shown in FIG. 1 and the wavelength selected by the etalon.

When the thickness of the etalon is 346.5 μm, 351.5 μm or 356.5 μm, that is, of a value deviated from the thicknesses at which the selected wavelengths $\lambda_o$ and $\lambda_{eo}$ become equal to each other by 2.5 μm, the selected wavelengths $\lambda_o$ and $\lambda_{eo}$ are shifted from each other by 0.4 nm, a half of the free spectral range (=0.8 nm) as shown in FIG. 4. Accordingly, in this particular embodiment, the thickness of the polarization control element 15 is set to 351.5 μm though it may be 356.5 μm or 346.5 μm.

Figure 5:
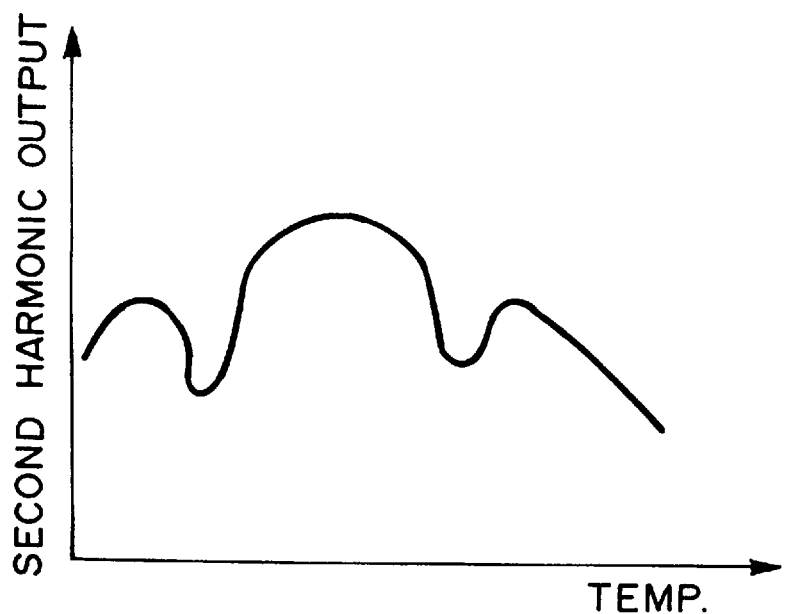
FIG. 5 is a graph showing the relation between the output of the conventional solid state laser and the temperature.

When the selected wavelengths $\lambda_o$ and $\lambda_{eo}$ are equal to each other as in the conventional system (the state shown in FIG. 3), light polarized in the $n_o$ direction, where phase matching with the periodic domain reversals of the optical wavelength conversion element 20 can be obtained, and light polarized in the $n_{eo}$ direction normal to the periodic domain reversals of the optical wavelength conversion element 20 both come to oscillate in a high-order transverse mode in a certain temperature range, which lowers the power of the oscillating light polarized in the former direction, i.e., the ordinary ray. Accordingly the output power of the second harmonic fluctuates with temperature as shown in FIG. 5.

Figure 6:
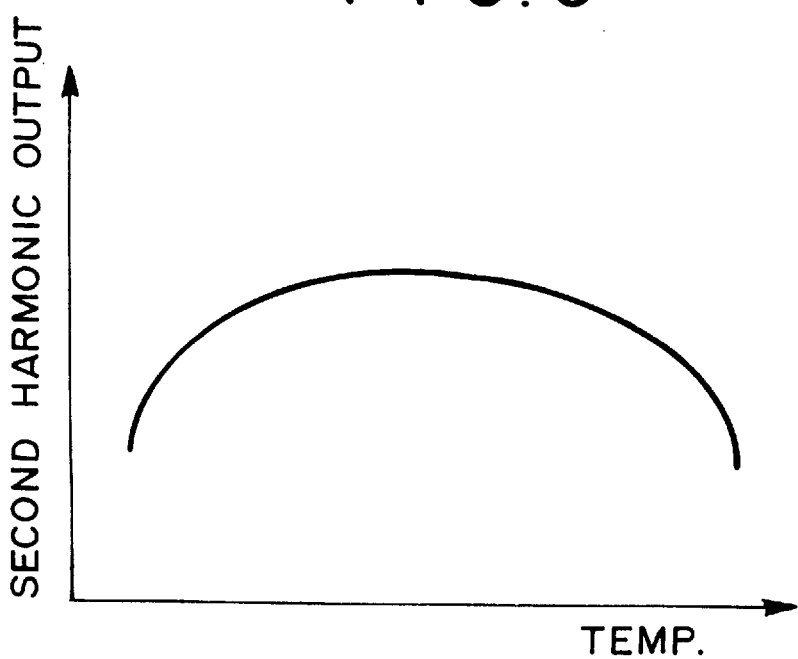
FIG. 6 is a graph showing the relation between the output of the solid state laser shown in FIG. 1 and the temperature.

To the contrast, in the case of the present invention where the selected wavelengths $\lambda_o$ and $\lambda_{eo}$ are different from each other as shown in FIG. 4, when the thickness of the etalon is selected so that the selected wavelength $\lambda_o$ for light polarized in the $n_o$ direction coincides with the gain peak of the YAG laser, the selected wavelength $\lambda_{eo}$ for light polarized in the $n_{eo}$ direction deviates from the gain peak of the YAG laser and accordingly oscillation of the light polarized in the neo direction is suppressed, that is, only the light polarized in the $n_o$ direction, i.e., the ordinary ray, is constantly oscillated. Accordingly, in the case of the present invention, the output power of the second harmonic is kept stable irrespective of the temperature as shown in FIG. 6.

As described above, in order to prevent oscillation in second etalon mode in the YAG laser which oscillates at 946 nm, the free spectral range of the etalon should be basically equivalent to the gain width of the YAG, 0.8 nm. At this time, the difference between the selected wavelength $\lambda_o$ for the light polarized in the $n_o$ direction and $\lambda_{eo}$ and that $\lambda_{eo}$ for the light polarized in the $n_{eo}$ direction can be 0.4 nm (50% of the free spectral range, 0.8 nm) at the most (FIG. 4). However when the difference between the selected wavelengths $\lambda_o$ and $\lambda_{eo}$ is at least 0.2 nm (25% of the free spectral range, 0.8 nm), the gain of the YAG in the $n_{eo}$ direction becomes not larger than ½ and oscillation of the light polarized in the $n_{eo}$ direction can be sufficiently suppressed.

The polarization control element of the present invention can be formed of various materials other than calcite. For example, $LiNbO_3$, rutile, quartz crystal, $YVO_4$ and the like can be used. As a material which exhibits a nonlinear optical effect and at the same time can effect wavelength conversion, $KTiOPO_4$ (KTP), $KNbO_3$, $LiNbO_3$, $LiTaO_3$ or the like can be used.

Though a wavelength conversion laser oscillating at 946 nm employing a Nd:YAG crystal as a laser crystal has been described above, also the output of other oscillating lines such as 1064 nm, 1300 nm and the like generated by use of the Nd:YAG crystal can be stabled against change in temperature by making the oscillation a single longitudinal mode and carrying out the polarization control in the similar manner.

What is claimed is:

1. A polarization control element for controlling the direction of polarization and the longitudinal mode of a laser, said polarization control element comprising a birefringent crystal functioning as a Fabry-Perot etalon and having light incident face and a light emanating face which are cut at an angle with respect to an optical axis of the crystal, wherein said birefringent crystal causes a beam incident on the light incident face to split into an ordinary ray and an extraordinary ray whose directions of polarization are normal to each other, and the thickness of the birefringent crystal is set so that different wavelengths are selected by the birefringent crystal for the ordinary ray and the extraordinary ray in order to suppress oscillation of the extraordinary ray and prevent high-order transverse mode oscillation.

2. A polarization control element as defined in claim 1, wherein a difference between the wavelengths selected by the birefringent crystal for the ordinary ray and the extraordinary ray is at least 25% of the free spectral range of the etalon.

3. A polarization control element as defined in claim 1, wherein said birefringent crystal is a calcite crystal.

4. A solid state laser system, comprising:
a light source;
a resonator;
a polarization control element provided in said resonator, said polarization control element comprising a birefringent crystal functioning as a Fabry-Perot etalon and having a light incident face and a light emanating face which are cut at an angle with respect to an optical axis of the crystal, wherein said birefringent crystal causes a beam incident on the light incident face to split into an ordinary ray and an extraordinary ray whose directions of polarization are normal to each other, and the thickness of the birefringent crystal is set so that different wavelengths are selected by the birefringent crystal for the ordinary ray and the extraordinary ray in order to suppress oscillation of the extraordinary ray and prevent high-order transverse mode oscillation.

5. A solid state laser system as defined in claim 4, wherein a difference between the wavelengths selected by the birefringent crystal for the ordinary ray and the extraordinary ray is at least 25% of the free spectral range of the etalon.

6. A solid state laser system as defined in claim 4, wherein said birefringent crystal is a calcite crystal.

* * * * *